T. F. PERKINS.
MEANS FOR UTILIZING ELECTRICAL ENERGY.
APPLICATION FILED MAR. 1, 1907.
927,675.
Patented July 13, 1909.
2 SHEETS—SHEET 1.
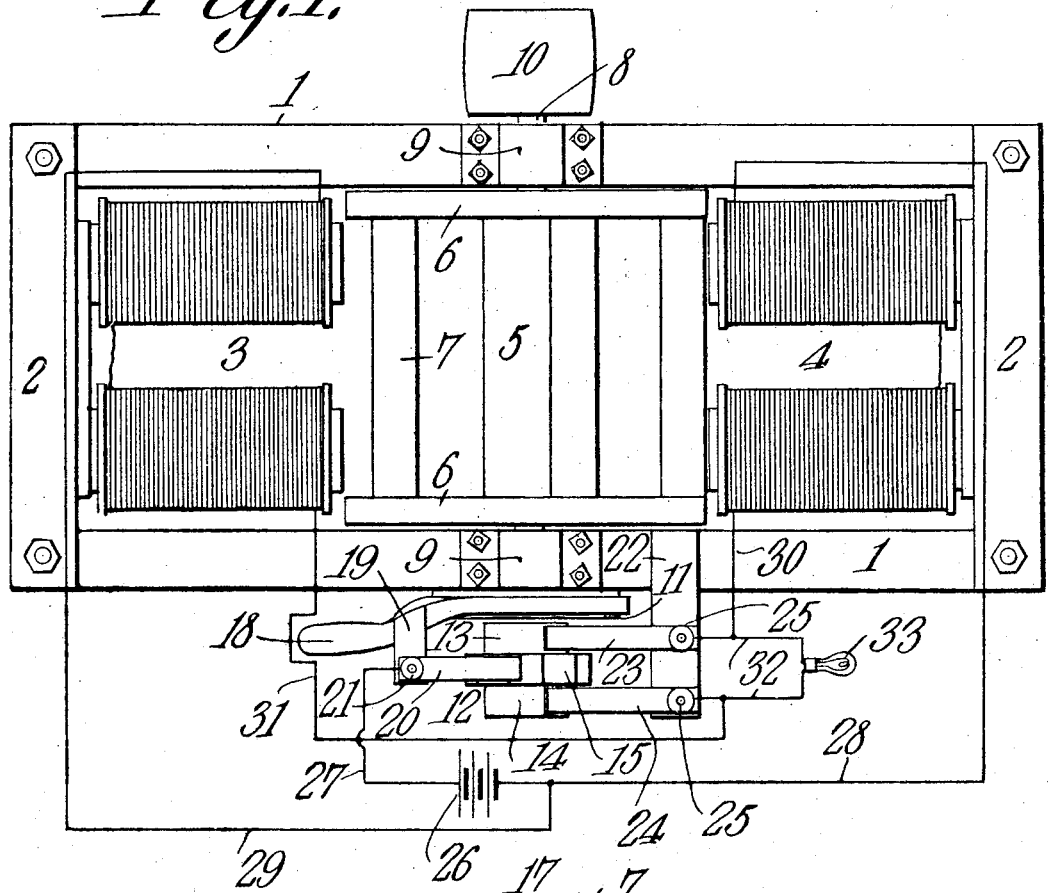
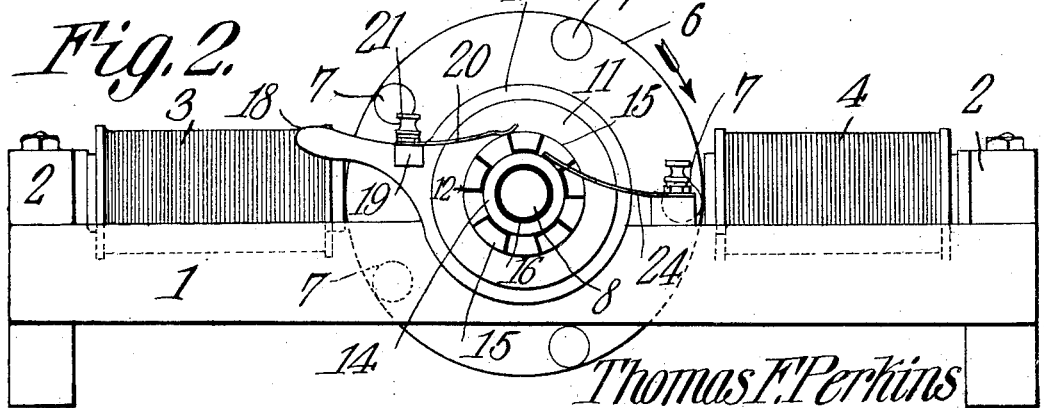
WITNESSES:
Thomas F. Perkins
INVENTOR
By C. A. Snow & Co.
ATTORNEYS T. F. PERKINS.
MEANS FOR UTILIZING ELECTRICAL ENERGY.
APPLICATION FILED MAR. 1, 1907.

927,675.

Patented July 13, 1909.
2 SHEETS—SHEET 2.

Thomas F. Perkins,
INVENTOR

By C. A. Snow & Co.
ATTORNEYS

WITNESSES:

UNITED STATES PATENT OFFICE.

THOMAS F. PERKINS, OF ATLANTA, TEXAS.

MEANS FOR UTILIZING ELECTRICAL ENERGY.

No. 927,675.   Specification of Letters Patent.   Patented July 13, 1909.

Application filed March 1, 1907. Serial No. 359,984.

*To all whom it may concern:*

Be it known that I, THOMAS F. PERKINS, a citizen of the United States, residing at Atlanta, in the county of Cass and State of Texas, have invented a new and useful Means for Utilizing Electrical Energy, of which the following is a specification.

This invention has reference to improvements in means for utilizing electrical energy, and its object is primarily to utilize in useful work electrical energy which has heretofore been to a great extent wasted or dissipated.

The invention consists in a type of electric motor which will utilize the current from a source of electrical energy such as a battery or dynamo and at the same time the extra current produced by the discharge of the field magnets is directed into another circuit containing lamps or other translating devices capable of using such extra current and producing light or other form of useful work.

The invention will be fully understood from the following detailed description taken in connection with the accompanying drawings forming part of this specification, in which,—

Figure 3:
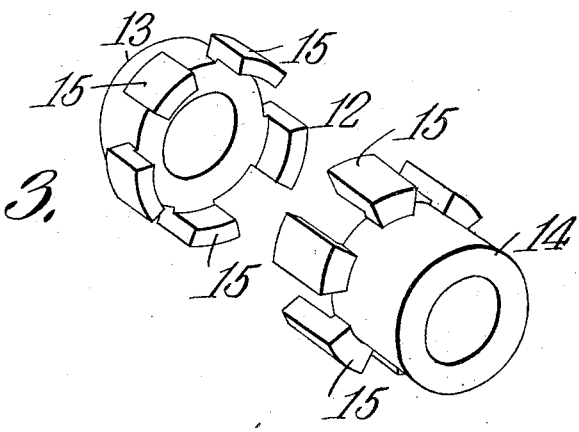
Figure 4:
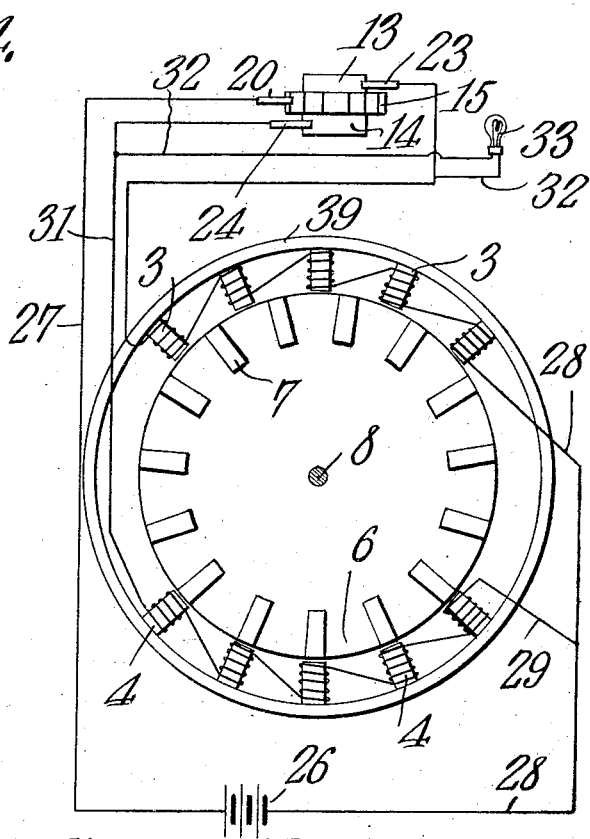

Figure 1 is a plan view of one type of motor embodying the invention and showing diagrammatically the circuit connections from the generator to the motor and the circuit connections for utilizing the extra current developed by the motor; Fig. 2 is a side view of the motor shown in Fig. 1 with the circuit connections omitted; Fig. 3 is a perspective view of the commutator with the parts separated and the insulation omitted; Fig. 4 is a diagrammatic view illustrating the invention applied to another form of motor.

Referring first to Figs. 1 and 2, there is shown one type of motor which is adapted for use in connection with my invention and which forms a part of my invention. In these figures there is shown a rectangular frame consisting of side bars 1 and end bars 2 which may be taken as typical of the frame of the machine. Upon the end bars 2 are mounted horse-shoe magnets 3—4 of ordinary type and with or without, but preferably with, laminated cores. The polar ends of these magnets project toward each other and between these polar ends is located the armature of the machine which, in the present instance, is shown as composed of a central drum 5 having at each end heads 6 supporting between them a series of iron bars 7—7 circularly arranged about the peripheries of the heads 6 and so related to the polar ends of the magnets 3 and 4 as to pass them in succession and in close relation thereto. The drum 5 is fast on a shaft 8 journaled in bearings 9 carried by the side bars 1. At one end the shaft 8 projects beyond its bearing 9 and there carries a pulley 10 from which power generated in the motor may be transmitted by suitable belting to the mechanism to be driven. At the other end of the shaft where it projects beyond its corresponding bearing 9 there is formed a grooved disk 11, concentric with the shaft and fixed to the corresponding side bar 1, and beyond this grooved disk a commutator 12, best shown in Fig. 3, is fixed on the shaft 8 for rotation therewith. This commutator consists of two sleeves 13—14 each terminating at one end in the same number of equi-distantly spaced, segmental blocks 15 projecting beyond and overhanging the end of the sleeve. These blocks 15 are equal in number on each sleeve and there are twice as many blocks 15 as there are armature bars, and the spaces between them are of greater width than the width of one of the segmental blocks. The construction is such that when the ends of the sleeves carrying the blocks 15 are brought into juxtaposition the blocks on one sleeve will enter the spaces between the blocks on the other sleeve and the spaces between the blocks thus intermeshed and also the space between the contiguous ends of the sleeves 13 and 14 are filled with insulating material so that while the segmental blocks when properly joined present a cylindrical surface, the two sleeves 13 and 14 and the blocks 15 carried thereby constitute a commutator having two insulated continuous conducting surfaces formed by the sleeves 13 and 14 and another insulated conducting surface alternately and successively in conducting connection first with one and then with the other of the two sleeves 13 and 14. Interposed between the shaft 8 and the sleeves 13 and 14 is an insulating sleeve 16.

The groove in the disk 11 is peripheral and seated in this groove there is an annulus 17 terminating on one side in a radially-projecting handle 18, and this handle carries an arm 19 of insulating material to which is secured a brush 20 bearing upon that portion of the commutator composed of the segmental blocks 15. Instead of making the arm 19 of insulating material, it may be made of metal and the brush 20 may be suitably insulated therefrom. The end of the brush where it is attached to the arm 19 has secured thereto a binding post 21 for the attachment of a circuit terminal to the brush 20. This construction permits the adjustment of the contact end of the brush about the periphery of the segmental blocks 15 upon the axis of the shaft 8 as a center.

Upon the side bar 1 adjacent to the commutator there is secured an arm or support 22 projecting laterally therefrom parallel with the shaft 8, and this arm or support 22 carries two brushes 23—24, each provided with a binding post 25 and bearing at its outer or free end upon the sleeves 13 and 14 respectively. The support 22 may, of course, be of metal and the brushes 23 and 24 and their binding posts 25 may be suitably insulated therefrom.

In the particular motor thus far described, two sets of field coils are used and the armature bars 7 are five in number, although any other odd number may be used if it be desired that the motor be self-starting. But if this is not material, an even number of armature bars is permissible. Also, it is within the scope of my invention to use a suitably wound armature instead of the simple iron armature illustrated. There is also shown a source of electrical energy typified by a battery 26. From one terminal of this battery there extends a conductor 27, the other end of which is connected to the brush 20 through the binding post 21. The other pole of the battery 26 is connected by a conductor 28 to one terminal of the magnet 4 and by another conductor 29 to one terminal of the magnet 3. The other terminal of the magnet 4 is connected by a conductor 30 to the brush 23 through its binding post 25, and the other terminal of the magnet 3 is connected by a conductor 31 to the brush 24 by its binding post 25. Branched between the conductors 30 and 31 or between the binding posts 25 on the brushes 23 and 24 is another circuit 32 containing a translating device or devices typified by a lamp 33 of the incandescent type.

Assuming that the armature is rotating in the direction of the arrow, Fig. 2, and that the parts are just approaching but have not quite reached the position shown in Fig. 2. Under these conditions the brush 20 bears upon a block 15 connected with the sleeve 13. The circuit is then established from the battery 26 through the conductor 28 to the magnet 4, thence by conductor 30 to the brush 23 and sleeve 13, thence by way of one of the blocks 15 to the brush 20, and returns to the other terminal of the battery by the conductor 27. Under these conditions the magnet 4 is energized and the nearest armature bar 7 is being attracted. When the armature bar 7, being attracted, reaches the center of the polar end of the magnet, the brush 20 bridges the insulating division between the particular block 15 under consideration and the next successive block and then immediately passes to the said block. The circuit is now established from the battery 26 through the conductor 29 to the magnet 3, thence by conductor 31, brush 24, and sleeve 14 to the block 15 then under the brush 20, and thence by the brush 20 and conductor 27 to the other terminal of the battery 26. The magnet 3 now being energized exerts a pull upon the armature bar 7 approaching it. This alternate and successive energizing of the electro-magnets 3 and 4 continues so long as the circuit is closed.

In the interim between each successive charge of an electro-magnet, the latter is of course discharged and this produces what is known as the extra current, which has heretofore been allowed to dissipate its energy without producing useful work. Now, in order to utilize this heretofore wasted energy, I provide the branch circuit 32 in which is included as many translating devices 33, either lamps or other types of translating devices, responsive to this current, as may be desired or as may be adapted to the current generated.

Referring now to Fig. 4, the circuit connections therein shown are the same as those shown in Fig. 1, and the motor structure instead of being bi-polar, that is, formed of two horse-shoe magnets only, is formed of two sets of horse-shoe magnets 3 and 4 mounted upon an annular frame 39. One set of magnets 3 are arranged around the periphery of the armature so as to embrace a portion thereof on one side of the center and the magnets 4 are similarly arranged on the other side of the center of the armature. All the magnets 3 are connected up in series and all the magnets 4 are connected up in series, but otherwise the circuits are the same as in Fig. 1. Also, there is an odd number of armature bars 7 which in this particular instance are shown as rectangular in cross section instead of round, it being understood that in either of the structures shown it is immaterial to the general operation of the motor whether the armature bars be round or otherwise shaped in cross section.

I claim:—

An electric motor comprising suitable field coils, and a translating device or devices all included in one closed circuit, an armature in operative relation to the field coil, a commutator composed of two insulated series of alternate contacts, the contacts of each series being connected in multiple, a prime source of current, connections between the prime source of current and the circuit including one terminal of the field coils, another connection between the source of current and commutator, and still other connections between the commutator and the circuit including the other terminals of the field coils and the translating device or devices included in series with the field coils.

In testimony that I claim the foregoing as my own, I have hereto affixed my signature in the presence of two witnesses.

THOMAS F. PERKINS.

Witnesses:
J. Ross Colhoun,
C. E. Logle.